Figure 1:
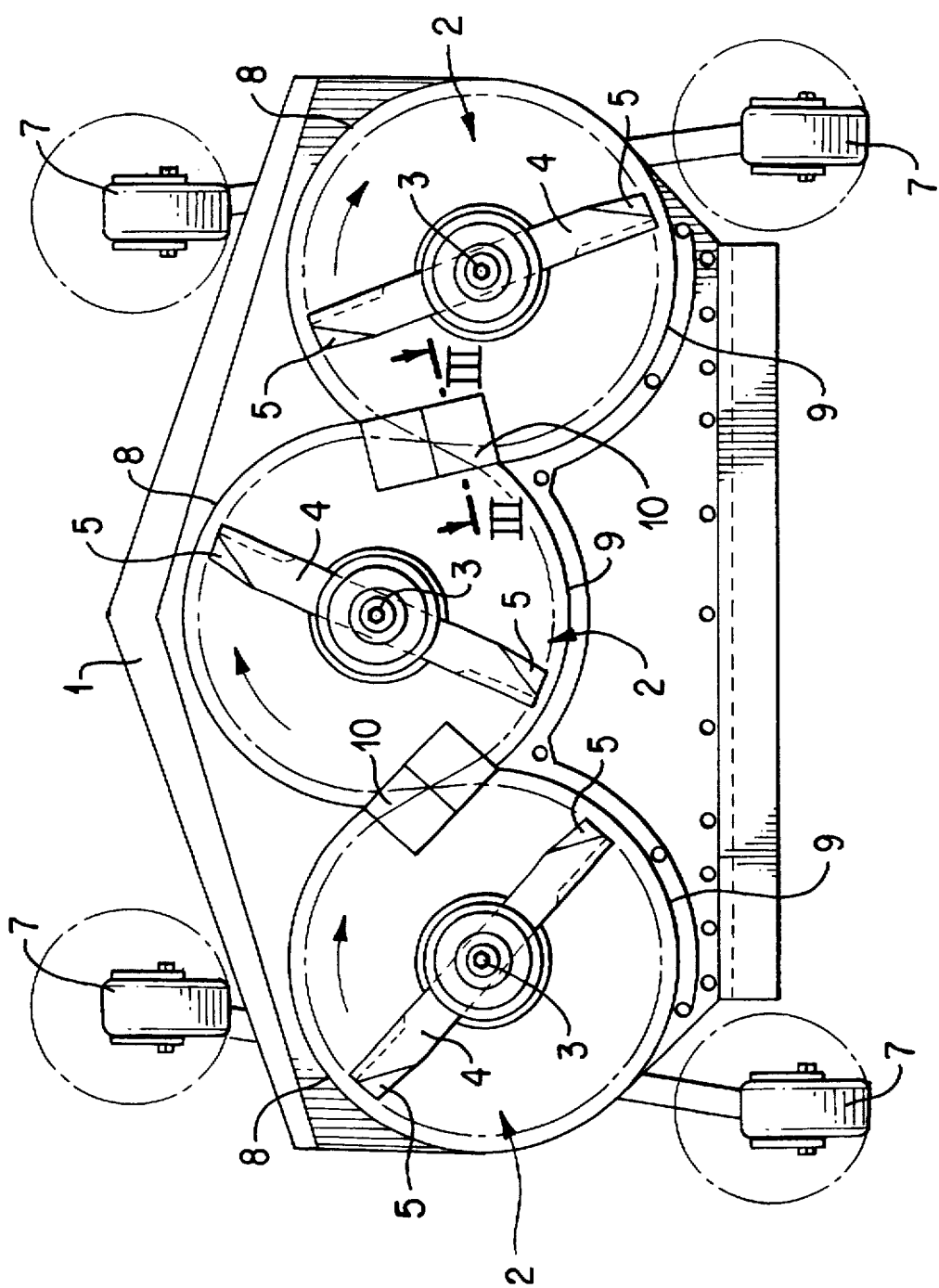

United States Patent [19]

Wiedenmann

[11] Patent Number: 5,791,132
[45] Date of Patent: Aug. 11, 1998

[54] MULCHING MOWER

[75] Inventor: Georg Wiedenmann, Rammingen, Germany

[73] Assignee: Wiedenmann GmbH, Rammingen Krs. Ulm, Germany

[21] Appl. No.: 700,545

[22] PCT Filed: Dec. 21, 1995

[86] PCT No.: PCT/DE95/01832

§ 371 Date: Oct. 30, 1996

§ 102(e) Date: Oct. 30, 1996

[87] PCT Pub. No.: WO96/20584

PCT Pub. Date: Jul. 11, 1996

[30] Foreign Application Priority Data

Dec. 29, 1994 [DE] Germany ............... 94 20 889.1 U

[51] Int. Cl.[6] .................................................. A01D 34/66
[52] U.S. Cl. .................. 56/320.1; 56/255; 56/320.2; 56/DIG. 20

[58] Field of Search ........................ 56/320.1, 320.2, 56/17.4, 17.5, 255, 295, DIG. 20, DIG. 24

[56] References Cited

U.S. PATENT DOCUMENTS 5,305,589 4/1994 Rodriguez et al. ............ 56/17.5 X
5,465,564 11/1995 Koehn et al. .................. 56/17.5 X Primary Examiner—Terry Lee Melius
Attorney, Agent, or Firm—Robert S. Lipton, Esq.; Lipton, Weinberger & Husick

[57] ABSTRACT

The invention relates to a mowing machine with at least one blade (4) rotating about a spindle (3), preferably with two mowing cutters (6) arranged symmetrically to the spindle, and preferably with several and especially three blades (4) rotating about parallel spindles (3), which is/are arranged in a mower housing (1) with the cuttings ejected towards the rear (regarded from the direction of mowing). In order to provide a mulch from the cuttings with such a mower, it is proposed that the blade(s) (4) be contained in the ejection direction by a wall system (8, 9).

14 Claims, 3 Drawing Sheets

MULCHING MOWER

The invention relates to a mowing machine having at least one blade rotatably driven about a generally vertical spindle—preferably with two mowing cutters located symmetrically with respect to the spindle, and preferably several, specifically three such mower blades respectively rotating around parallel spindles, positioned within a mower housing, with resulting ejection of mower cuttings toward the rear (opposite to the direction of travel).

Mowing machines of this kind are known in many varieties. However, there does remain the desire to not only cut the material to be mowed, but also to further comminute it because the mulch which results therefrom is useful for fertilizing the soil. This means that the mowed material in its comminuted configuration is no longer removed from the mowed lawn surface, but can be left lying there in its comminuted form in ecologically advantageous fashion. By so doing, one eliminates not only the disposal of the cuttings, but the comminuted material actually also serves for soil preparation in its mulch-adapted form.

Accordingly, the objective of the invention is to construct a mowing machine of the initially described kind in such manner that a product useable as mulch is created from the cuttings.

This objective is achieved in accordance with the invention by surrounding the one or more mowing blades with peripheral walls (skirts) in the direction of ejection.

In a preferred embodiment the skirts are vertically adjustable as a unit or in several separate parts, relative to the surface of the ground which is to be treated; in particular the skirts are formed in two parts, namely in such a manner that the portion of the skirts which is closest to the ground to be treated is adjustable, relative to a base portion which is fixedly attached to the mower housing, preferably by means of slots oriented perpendicularly to the ground and connecting bolts extending through them.

The cutters of the mowing blade, specifically constructed as two cutters diametrically opposed and extending away from the axis of rotation, are preferably at least partially bent "upwardly" in such manner that there is created an air flow which causes the material to be mowed to stand upright, i.e. a stream in a direction approximately perpendicular to the plane of the material to be mowed. Under this influence, the mowed material is lifted up above the mowing plane of the mowing blade. In order to condition this mowed material for further comminution into a kind of mulch, in the preferred embodiment using several mowing blades, there is provided, at the transition from one mowing blade to another, a deflector which is so shaped that the mowed material is directed toward the ground, i.e. into the range of the adjoining mowing blade. This deflector is preferably made as a roof-shaped arch pointing toward the ground, specifically of sheet metal of triangular cross-section in the transition region between one mowing blade and the adjoining one and fastened to the top surface of the mowing machine housing.

By virtue of this special step of deflecting the previously cut material, there is achieved repeated cutting of this material, especially grass, so that there are created cuttings which are better able to decompose and therefore serve as fertilizer, which do not need to be removed in contrast to long-stemmed cuttings, but can be left on the surface of the mowed ground and serve as fertilizer.

The standing upright of the material to be mowed which arises from the mowing blade shape—partially bent upwardly—on the one hand, and on the other hand the deflection of the initially cut material into the range of the mowing blade, especially of the adjoining one, effect the comminution of the mowed material beyond that produced by the mowing and therefore has the desired mulching effect, i.e. the mowed material remains as "fertilizer", lying on the mowed ground.

Figure 2:
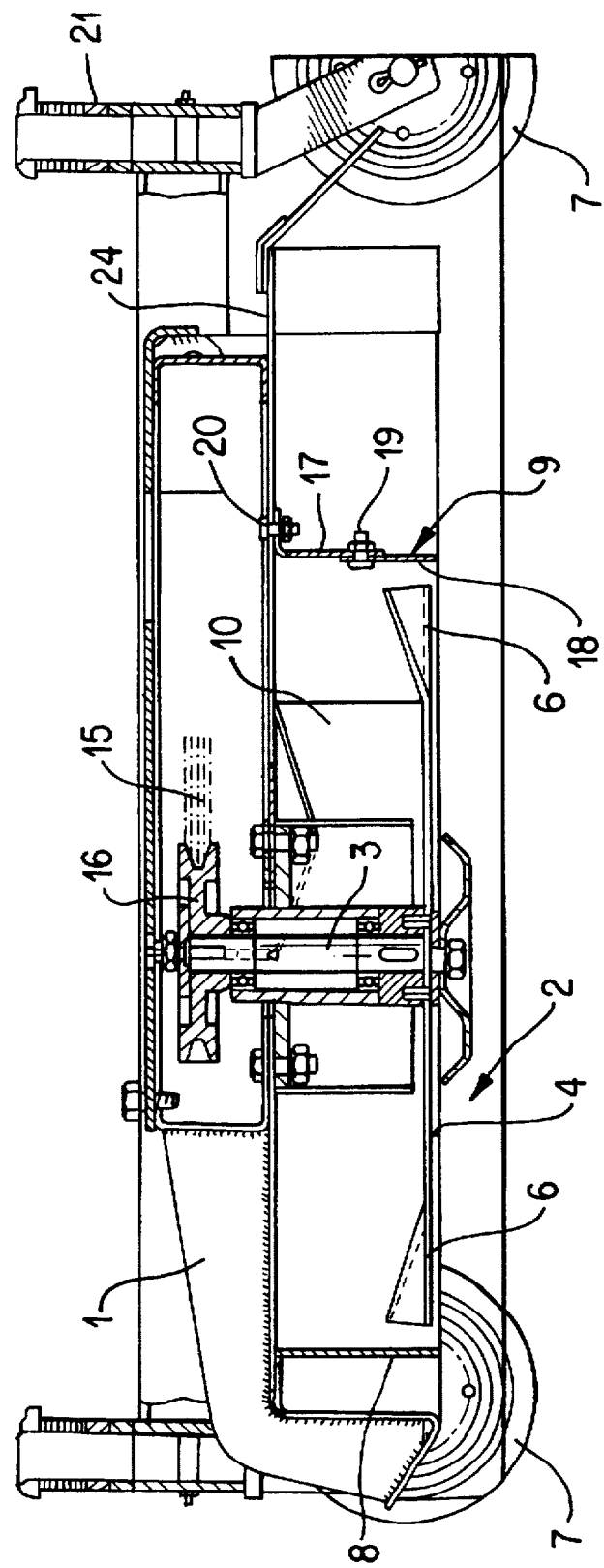
Figure 3:
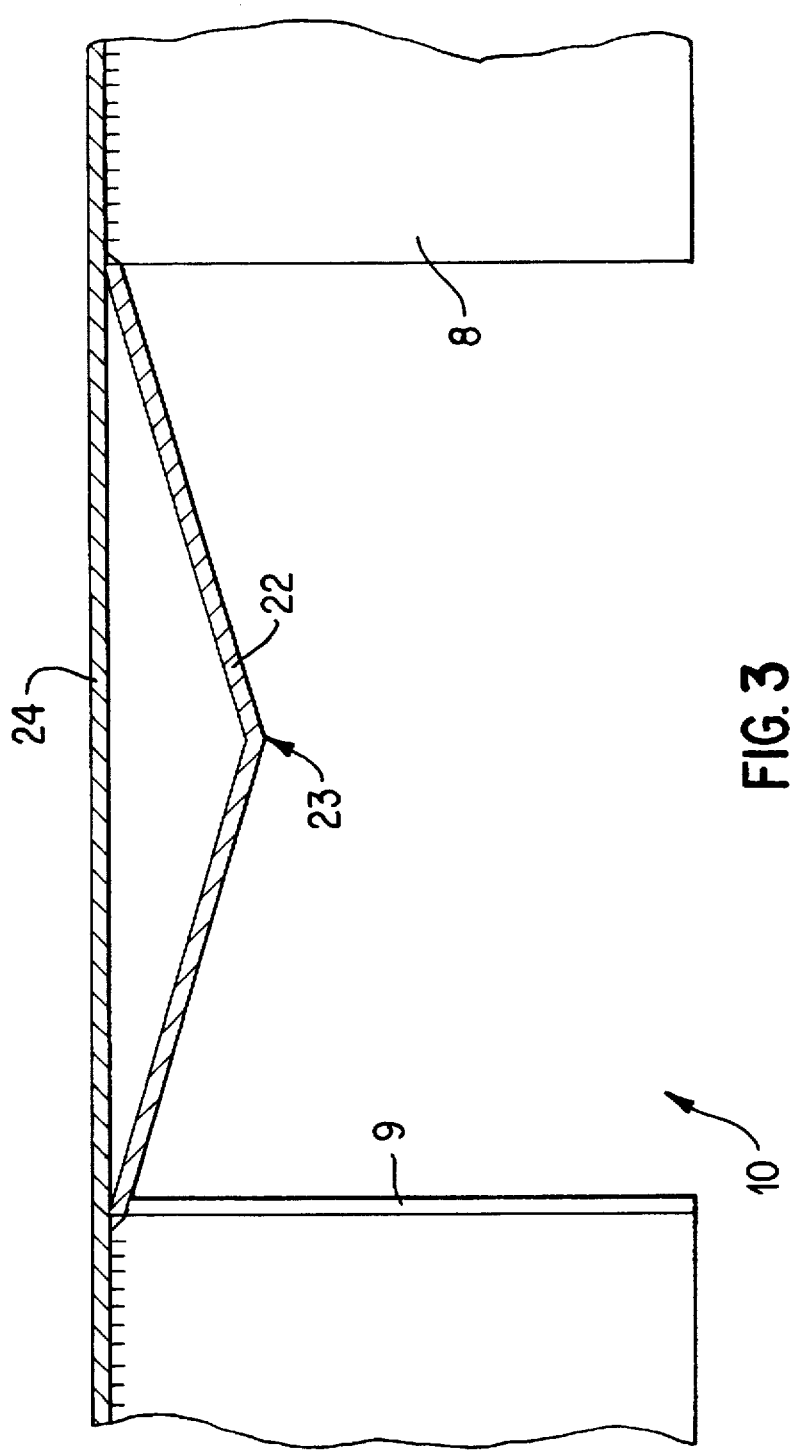

Further attributes and details of the invention appear from the dependent claims in conjunction with the illustrative embodiments shown in the drawing. There is shown in:

FIG. 1: a view of a mowing machine having three mowing blades as seen from the bottom of the material to be mowed;

FIG. 2: a cross-sectional view through a machine according to FIG. 1;

FIG. 3: a diagrammatic partial view along the line III—III in FIG. 1.

In a housing 1, which is shown diagrammatically as a bottom view of the illustrative embodiment seen from below, there are three mowing implements 2, each one of which includes a pair of cutters 4 adapted to be rotatably driven about a vertical spindle 3. Basically, such apparatus is known. In the corner regions 5 the cutters are provided with upwardly bent, angled portions 6 which create an upwardly directed air flow. The illustrated mowing machine may, for example, take the form of a machine connected to the front of a tractor or the like via a coupling and particularly a parallel steering arrangement, and travels over the ground to be mowed on support wheels 7.

The three mowing blades 4 in the illustrative embodiment are surrounded by forward skirts 8 and rearward skirts 9. The latter prevent the cuttings mowed by the mowing blades 4—cutters—from being ejected immediately into the rear portion of the mowing machine through the dynamic ejecting movement of the cutters; rather these rearward skirts 9 prevent this immediate ejection and therefore cause the cuttings to be subjected to a repeated comminution process, either by the same blade pair 4 which has done the cutting, or by the adjoining cutter pair 4.

Because the cuttings are conducted away from the ground due to the angled portions of the cutting blades, which create the ready-for-cutting straightening up of the material to be cut, in a particularly preferred embodiment of the invention there is provided a deflector which guides the path of travel of the cuttings from the plane of rotation above the cutters 4 of the mowing machine back downwardly so that, especially during passage from one mowing blade (mowing cutter pair 4)—to the next, the material cut by the first cutter pair 4 is guided into the plane of rotation of the adjoining cutter pair 4. In this manner, it is made certain that there will be no plugging up and that the cuttings are indeed further comminuted by the adjoining implement.

The rearward skirts 9 prevent these cuttings from escaping the further comminuting process. On the other hand, the spacing from the ground of the material to be mowed insures that the cut and subsequently further comminuted—chopped—material returns to the ground, so that the fertilizing effect of the finely comminuted material—mulching—is restored.

In a preferred embodiment of the invention, the rearward skirt 9 can be adjusted as to its spacing from the ground, specifically because a portion of the skirt facing the ground is adjustable in height relative to a base portion which is fixedly attached to the housing. In a further preferred embodiment, provision is further made to insert or remove the entire rearward skirt 9 at will, so that one can set up, not only the previously described mulching process, but also a conventional mowing process with rearward ejection without additional comminution of the cuttings.

In the preferred embodiment of the invention, the deflection of the cuttings which is required by the upward movement caused by the operation of cutter pairs 4 takes place in the respective transition regions between two cutter pairs 4 in such a manner—as shown in FIG. 1—that the cuttings which are tangentially transported in the circumferential direction of the respective preceding cutter pair 4 are brought into the rotational region of the cutter pair 4 which follows in the transport direction. This transfer device 10 is preferably provided in the form of roof-shaped sheet metal which, when viewed from the bottom, is located in the upper end of the housing portions which confine the cutter pairs 4, as shown in FIGS. 1 and 3. This transfer device 10 does not have to be roof-shaped, it can also take the shape of a ramp. In a particularly preferred embodiment, this rectangular transfer sheet 10 is inserted, by means of its diagonally opposed corner portions, peripherally into the housing skirts 8, 9 which surround the cutter pairs 4, as shown in FIG. 1.

From FIG. 2 it can been seen that each cutter pair 4 is driven by a belt 15 which acts upon a pulley 16 which is fixedly attached to the end of the vertical spindle 3 opposite the cutter pair 4. Furthermore, it can been seen from FIG. 2 that the rearward skirt 9 is made in two parts. The rearward skirt 9 consists of a first element 17 of L-shaped cross-section and a second element 18 adjoining the L-shaped element 17 and having a rectangular cross-section. The element 18 is attached to the L-shaped element 17 by several bolt connections 19 in such manner that the element 18 is moveable relative to the L-shaped element 17 after loosening the bolt connections 19. In this way the spacing of the rearward skirt 9 from the ground can be adjusted.

The L-shaped element 17 is attached to the mower housing 1 by means of bolt connections 29, with the shorter leg of the L-shaped element 17 adjoining a plate-shaped part of the housing 1.

As can further be seen from FIGS. 1 and 2, four support wheels 7 are attached to housing 1, at least the rearwardly support wheels 7 being rotatably journaled in a bearing 21. In this way, the ability of the mowing machine to follow a curving path is enhanced.

FIG. 3 shows the construction of the transfer device 10 between two adjoining cutter pairs 4. In FIG. 3 there can be seen the roof-shaped sheet 22 which extends into the interior of transfer device 10, with its apex 23 located at substantially the same distance from the two vertical borders of transfer device 10, namely the rearward skirt 9 and the forward skirt 8. It should also be noted that what is involved here is the rearward skirt 9 of the first cutter pair and the lateral skirt of the second, adjoining cutter pair 4. The roof-shaped sheet 22 is welded to a cover plate 24 for the housing 1. In addition, the rearward skirt 9 and the forward skirt 8 of the cutter pairs 4 are attached to this cover plate 24. Furthermore, for each cutter pair 4 there is provided an opening in the cover plate 24 through which the vertical spindles of the cutter pairs 4 extend.

I claim:

1. A mowing machine, comprising:
   (a) a housing;
   (b) at least two sickle mowing blades rotatably driven in the same rotational direction about respective vertical spindles, said mowing blades being arranged within the housing;
   (c) a skirt associated with each mowing blade and depending from the housing, each skirt prevents the immediate ejection of cut material by substantially enclosing its respective mowing blade except for a section defined by a common vertical plane in which the ends of both longitudinal axes of the adjacent sickle mowing blades extend;
   (d) a deflector means attached to the housing in such a manner as to bridge said common vertical plane to provide a means to discharge cut material from one sickle mowing blade to an adjacent sickle mowing blade.

2. The mowing machine according to claim 1 characterized in that each skirt is subdivided into a rearward skirt (9) and a forward skirt (8), the forward skirt (8) is positioned in front of its respective mowing blade (4) in the direction of travel during the mowing process.

3. Mowing machine according to claim 2, characterized in that
   the rearward skirt (9) is bolted directly or indirectly to the mower housing (1).

4. Mowing machine according to claim 2 characterized in that
   the skirts (8, 9), and particularly the rearward skirt (9) is attached to the mower housing (1), vertically adjustable as a unit or in several parts with respect to the surface of the ground to be treated.

5. Mowing machine according to claim 4, characterized in that
   the adjustable skirts (8, 9) are adjustable by means of slots extending perpendicularly to the ground and connecting bolts (19) passing therethrough.

6. The mowing machine according to claim 2 characterized in that the forward skirts are welded to the housing.

7. Mowing machine according to claim 1 characterized in that
   the deflector (10) is a sheet metal connector.

8. Mowing machine according to claim 1 characterized in that
   the deflector (10) has the form of a roof-shaped arch oriented toward the ground, and specifically of V-shaped cross-section.

9. The mowing machine according to claim 8, characterized in that the apex of the V-shaped deflector is directed downwards away from the housing and the inclined surfaces generally project tangentially into the conveying path of the cut material of its respective mowing blade.

10. Mowing machine according to claim 1 characterized in that
    the deflector (10) is inserted by its diagonally opposite corner regions peripherally into the skirts (8, 9) surrounding the mowing blades (4).

11. Mowing machine according to claim 1 characterized in that
    the mower housing (1) has at least two, and preferably four support wheels (7), of which at least one and preferably two are journaled rotatably within a bearing (21).

12. Mowing machine according to claim 11 characterized in that
    the support wheels (7) are attached to housing (1) at adjustable heights.

13. The mowing machine according to claim 1 further characterized in that each of said sickle mowing blades has at least two cutter portions on the leading edge of each sickle mowing blade arranged symmetrically with respect to said spindle.

14. The mowing machine according to claim 13 characterized in that at least a portion of of the trailing edge of each mowing blade (4) is bent in the direction toward the mower housing (1).

* * * * *